(12) United States Patent
Mazin

(10) Patent No.: US 8,460,731 B2
(45) Date of Patent: Jun. 11, 2013

(54) SYSTEM AND METHOD FOR PRODUCING A DEHYDRATED FOOD PRODUCT

(76) Inventor: Jack G. Mazin, Thornhill (CA)

( * ) Notice: Subject to any disclaimer, the term of this patent is extended or adjusted under 35 U.S.C. 154(b) by 1041 days.

(21) Appl. No.: 12/114,077

(22) Filed: May 2, 2008

(65) Prior Publication Data

US 2008/0274263 A1 Nov. 6, 2008

Related U.S. Application Data

(60) Provisional application No. 60/915,870, filed on May 3, 2007.

(51) Int. Cl.
*A23L 1/10* (2006.01)

(52) U.S. Cl.
USPC ............ 426/465; 426/640; 426/321; 426/456

(58) Field of Classification Search
USPC .................................. 426/465, 640, 456, 321
See application file for complete search history.

(56) References Cited

U.S. PATENT DOCUMENTS

| | | | |
|---|---|---|---|
| 1,609,720 A | 12/1926 | Humphrey | |
| 1,717,489 A | 6/1929 | Barlow Bronson | |
| 4,103,035 A * | 7/1978 | Fulger et al. | 426/321 |
| 4,542,033 A | 9/1985 | Agarwala | |
| 5,188,861 A * | 2/1993 | Mazin et al. | 426/640 |
| 6,103,285 A * | 8/2000 | Guzman et al. | 426/302 |
| 6,159,527 A | 12/2000 | Wettlaufer | |
| 6,858,242 B1 * | 2/2005 | Formo | 426/410 |
| 7,188,772 B2 | 3/2007 | Elgie et al. | |
| 2004/0009267 A1 * | 1/2004 | Muggride et al. | 426/95 |
| 2005/0037118 A1 * | 2/2005 | Panaioli et al. | 426/509 |
| 2005/0056157 A1 * | 3/2005 | Savage et al. | 99/408 |

OTHER PUBLICATIONS

Supplementary European Search Report for European Application No. 08 76 9270 dated Oct. 28, 2010.

* cited by examiner

*Primary Examiner* — Drew Becker
*Assistant Examiner* — Preston Smith
(74) *Attorney, Agent, or Firm* — Steven M. Hoffberg; Ostrolenk Faber LLP

(57) ABSTRACT

A process and apparatus for preparing a dried food product said process comprising treating a dried food with an aqueous acidulant, in an amount and for a period of time which is sufficient to modify a surface of the food to increase water permeability; dehydrating the acidified food to obtain a desired moisture content with heat; cooling the heated dehydrated acidified food; and infusing the cooled dehydrated acidified food with an infusate.

17 Claims, 5 Drawing Sheets

SYSTEM AND METHOD FOR PRODUCING A DEHYDRATED FOOD PRODUCT

FIELD OF THE INVENTION

The present invention relates to the field of dehydrated food products, and more particularly to food products which are modified by the addition of constituents, such as flavors, nutrients, preservatives, colorings, coatings, etc.

BACKGROUND OF THE INVENTION

Dried fruits such as raisins, prunes, apples, apricots, and peaches are recognized as highly nutritious food products. Raisins, for example, are a good source of iron, and they supply calcium, magnesium, potassium, phosphorous, B vitamins, protein and dietary fiber. (Foods and Food Production Encyclopedia, Considine, D. M. ed., Van Nostrand Reinhold Company, New York 1982, pages 1639-1942). Dried fruits are utilized as snack foods, confectionaries, etc., and as ingredients in foods such as snack foods, confectionaries, biscuits, cookies, cakes, dairy products, cereals, etc. Dried fruits are typically sweet, chewy, and resilient to mechanical food processing equipment.

U.S. Pat. No. 1,717,489 (issued Jun. 18, 1929 to Barlow) discloses a method of changing the flavor of dried fruits comprising combining the expressed juice of one fruit with another fruit which has been sun-dried or evaporated or which is in the process of drying. In one method disclosed a dry or drying fruit is immersed in the fruit juice of another fruit for a short time and then put again to dry; the process being repeated until the desired result is fully obtained. The method disclosed in the reference leaves much to be desired in terms of processing efficiency and processing costs and the tendency of the fruit juice to ferment over time may result in a product having an alcoholic taste. In addition, the absence of preservatives in the fruit juice and/or repeated applications of the fruit juice to the dry or drying fruit may introduce undesirable microorganisms into the dried fruit product shortening the shelf life of the product and more importantly, rendering the product harmful to consumers. Further, the repeated application of the fruit juice to the dry or drying fruit increases the sugar content resulting in a sticky product which is nutritionally less desirable. Repeated drying of the fruit also reduces the content of nutrients and volatiles in the fruit which effects the nutritional, and aroma and flavor qualities, respectively of the product.

See, U.S. Pat. Nos. 5,188,861, 1,609,720, 1,717,489, 4,542,033, expressly incorporated herein by reference. See also JP 61-216641 (September, 1986), Furia, CRC Handbook of Food Additives, vol. 1, 1972, CRC Press Inc., Cleveland, pp. 225-253.

A number of technologies are available for infusing fruits with carbohydrates, flavors, colors, and the like. See, U.S. Pat. Nos. 7,188,772, and 6,159,527, each of which is expressly incorporated herein by reference.

SUMMARY OF THE INVENTION

The present invention provides a system and method for modifying a dried food product to enhancing the ability to infuse substances within its body. As used herein, the word "dried" is intended to mean that the product has a reduced moisture content as compared to a corresponding fresh agricultural product, and is not intended to require any particular moisture reduction or maximum moisture level unless particularly noted herein.

For example, an unmodified raisin has a relatively impervious skin, which impedes liquid absorption. This leads to relatively slow uptake of liquids and slow dehydration after processing. The present invention modifies the surface or shell of a dried fruit to increase permeability and surface area, without substantially changing its appearance, texture, or usage properties in food.

In conjunction with the surface modification, the present invention also permits the spatial control or modification of soluble components within the dried food. For example, in accordance with one aspect of the invention, the naturally occurring sugar distribution in a raisin can be reduced in the outer regions, leading to a product which has diminished bleeding tendencies and stickiness.

It is therefore an object to provide a process and apparatus therefore, for preparing a dried food product comprising treating a dried food with an aqueous acidulant, in an amount and for a period of time which is sufficient to modify a surface of the food to increase water permeability; dehydrating the acidified food to obtain a desired moisture content with heat; cooling the heated dehydrated acidified food; and infusing the cooled dehydrated acidified food with an infusate. The dried food preferably comprises a dried fruit. The infused food may be further cooled to a temperature below about 50 F and then packaged. For example, the packaging may be a moisture barrier sealed bag or pouch. The infusate may be a heat labile composition, and thus the cooling step cools the dehydrated acidified food to a temperature below about 100 F from a temperature above about 150 F, preferably the cooling step cools the dehydrated acidified food to a temperature below about 80 F from a temperature above about 160 F, and most preferably the cooling step cools the dehydrated acidified food to a temperature of about 70 F from a temperature between about 160 F-180 F.

Another object of the invention is to provide a dried food product produced by a process comprising treating the dried food with an aqueous acidulant, in an amount and for a period of time which is sufficient to modify a surface of the food to increase water permeability; dehydrating the acidified food to obtain a desired moisture content with heat; cooling the heated dehydrated acidified food; and infusing the cooled dehydrated acidified food with an infusate. The infusate may, for example, comprise a flavoring, preservative, coloring, humectant, fortification (vitamins, minerals, nutritional supplement), alcohol, sweetener (sugar or a low calorie substitute or a sugar alcohol, etc.). In fact, in alcohol fortified product, the alcohol may be added at any stage subsequent to the drying, and for example, may be added during packaging, since the alcohol will tend to redistribute evenly through the product after packaging in a vapor barrier package.

According to a particularly advantageous aspect of the invention a heat labile infusate, for example a volatile flavoring, or certain vitamins, is added to the product after all substantial heating steps are concluded, for example where the remainder of the process does not subject the heat labile infusate to process temperatures above about 100 F.

It is a further aspect of the invention to provide an apparatus for preparing a dried food product, comprising a tumbler, receiving a dried food, and treating the dried food with an acid solution; a heater, for dehydrating the acidified food; a cooler, for reducing a temperature of the heated dehydrated acidified food; and a spray infuser, for coating the cooled dehydrated acidified food with an infusant. The dried food preferably comprises a fruit, and more preferably comprises a berry or small fruit with a surrounding skin. Preferably, the food is seedless, either as a seedless variety, or having been de-pitted. Exemplary dried foods are raisins and currants. The apparatus may further comprise a chiller for further cooling the infused dehydrated acidified food to a temperature below about 50 F, and preferably to about 35 F.

DETAILED DESCRIPTION OF THE INVENTION

One typically application for the invention is for flavoring raisins.

One embodiment of a food processing apparatus and method according to the invention employs a special tumbling system (scissor mesh cascading drum) which receives the food product and declumps it, acidifies it, and cleans debris, such as stems, capstems, and foreign objects from the product, using a rotary perforated conveyor system. This tumbling system receives a food product to be processed, which is typically a dehydrated food, which, after processing, is tolerant, or indeed, benefited by the acidification. This declumping system is designed to minimize tear or damage to the surface of the dried food. Typical food products are dried fruits, though vegetables and other foods may also be appropriate. Especially preferred are raisins, currants, and cranberries. Pomegranate may also be processed.

A typical configuration provides a conveyor belt with the dried food spread across, which leads to a staging area where the dried food is engaged, by a set of pins and paddles, and drawn into the tumbling system. The configuration of the conveyor and pins may be modified to suit the dried food to be processed.

The tumbler is preferably inclined to provide a gravity feed of the dried food therethrough. Of course, other methods of feed are possible, and therefore the tumbler system is not limited to inclined designs.

Figure 1:
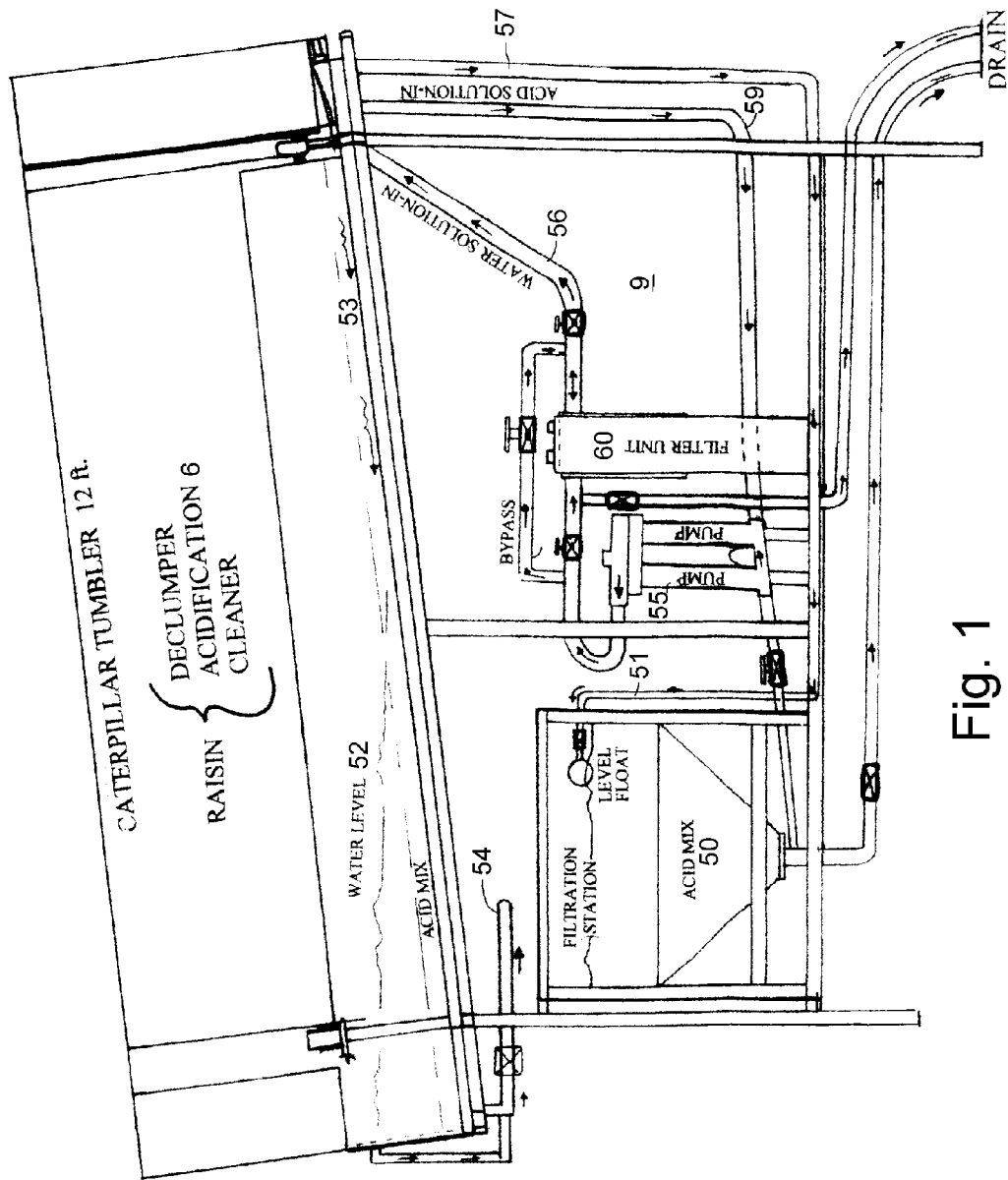
FIG. 1 shows a side view of a tumbler system according to the present invention, showing the various fluids and controls.
Figure 2:
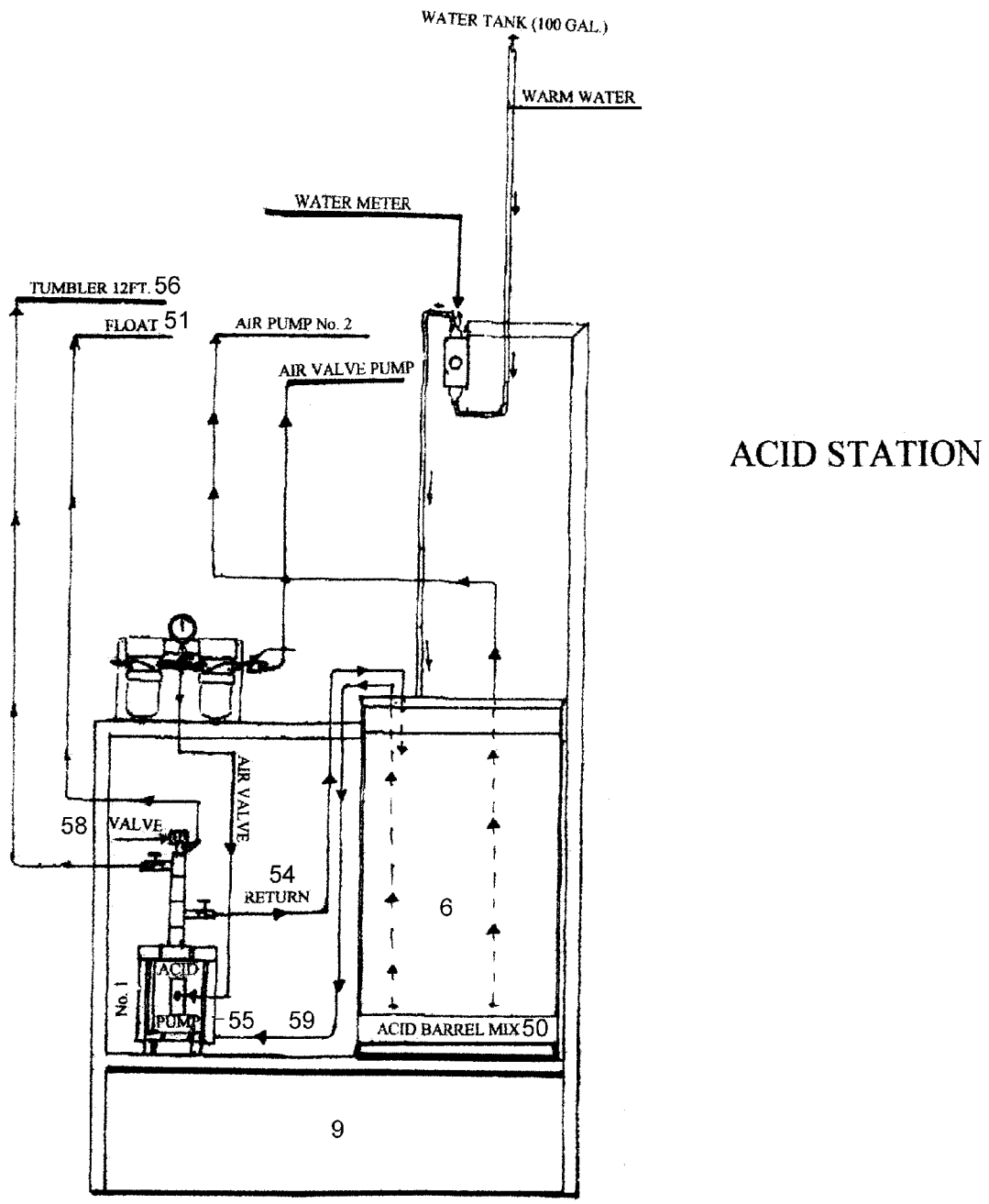
FIG. 2 shows a semi-schematic view of an acid station, including controls, for providing the acid to the tumbler system.
Figure 3:
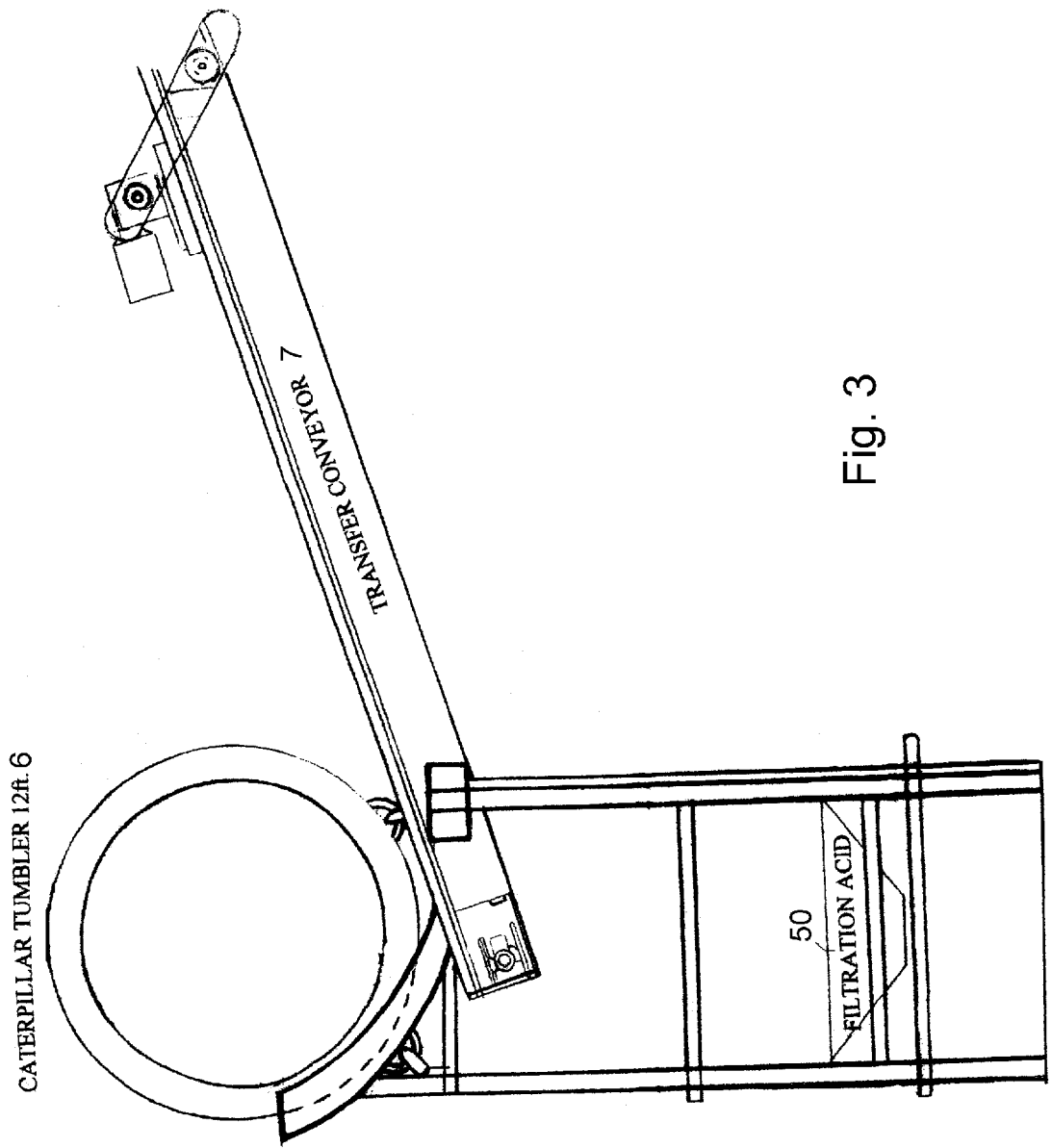
FIG. 3 shows an end view of the tumbler system with the inlet transfer conveyor.

As shown in FIGS. 1 (side view), 3 (end view) and 2 (schematic view), the tumbling system has a set of liquid conduits to hydrate the dried food. As the dried food enters the tumbling system having tumbler 6, it is mixed with water, which may be recycled. This water assists in separating clumps of dried food, and removing debris, stems, capstems, and the like, which may be adherent to the food. For example, a 12 foot long, 4 foot diameter tumbler 6 rotates at about 6 rotations per minute. The tumbler 6 is perforated, with holes designed to retain the food, but permit the debris to pass through. A heated acid mix 50 is pumped with pump 55 to an upper, inlet portion of the tumbler 6, and the fluid 53 flows downward toward the exit, pooling 52 near the bottom, such that the previously dried food is completely covered in acid fluid and rehydrated to a significant extent. The level of the fluid is maintained by an inlet 56, which sprays the dried food, from the pump 55, through valve 58, and a return 54, which leads back to the acid mix 50 container for filtering. A float valve 51 maintains a constant level. Excess fluid is fed to a drain, and the acid fluid in the acid mix 50 container is filtered in filter unit 60. The dried food, for example raisins, are thus treated by spraying with an acid, and immersed in a heated acid solution, in a vibrating rotary tumbler 6 system.

Figure 4:
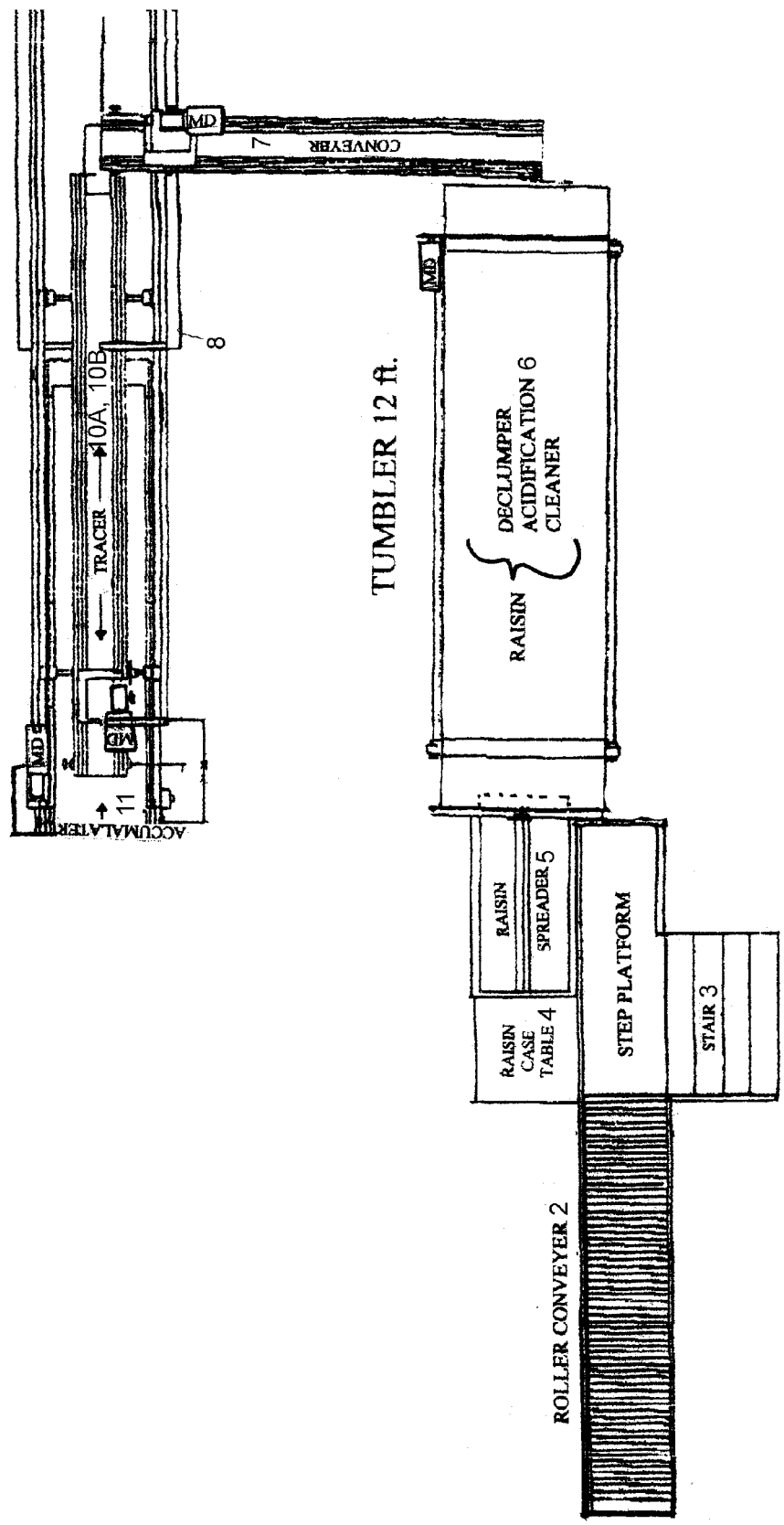
FIG. 4 shows a top view of the system showing a spreader feeding dried food to the tumbler, a conveyor leading from the tumbler to the staging area, and a tracer conveyor leading to the dryer.
Figure 5:
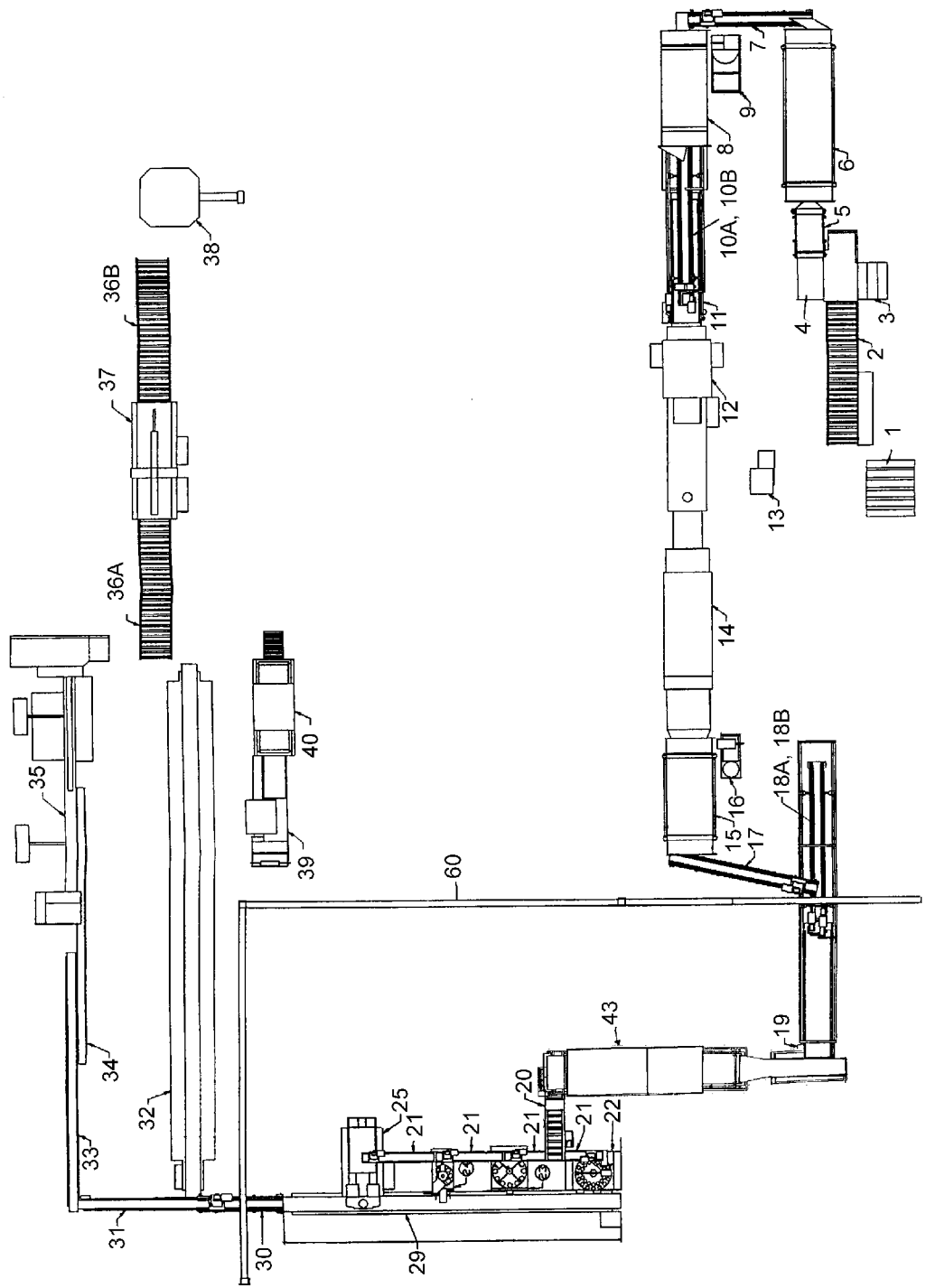
FIG. 5 shows a top view of the entire apparatus, including optional components.

FIGS. 4 and 5 show a system layout for a system according to the present invention. The elements shown are:

1 Pallet; 2 Roller conveyor; 3 standing platform with stairs; 4 Feed-in table; 5 Accumulator & Regulator conveyor; 6 12' Tumbler Declumper Cleaner Acidifier; 7 Upright transfer conveyor; 8 8' staging conveyor; 9 Acidification dispenser; 10 Tracer-raisins spreader (A & B); 11 Accumulator production; 12 Dryer (A line); 13 Control-Electric Panel (A line); 14 Cooling Unit; 15 Flavor Unit; 16 Flavoring Dispenser; 17 Upright transfer conveyor; 18 Tracer-raisins spreader (A & B); 19 Accumulator packaging; 20 Bucket lift; 21 Staging conveyor with divider (A); 22 Stoke packaging machine; 23 Mirapack packaging machine; 24 Hanzella packaging machine; 25 Monobag packaging machine; 26 Main electrical control; 27 Staging conveyor control; 28 Conveyor control; 29 Packaging take-out conveyor; 30 Upright transfer conveyor; 31 Inspection conveyor; 32 Display pack-up conveyor; 33 Transfer conveyor to Langen; 34 Langen conveyor; 35 Langen boxing machine; 36 Rolling conveyor (A, B); 37 Padlocker; 38 Sprialgrip wrapper; 39 L Bar sealer; 40 Heat shrink tunnel; 41 Control-Electric panel (B line); 42 Dryer (B line); and 43 Chilling unit system.

As shown in FIGS. 4 and 5, cased raisins (or other dried fruit) are placed on the roller conveyor 2, and are then manually placed on the raisin case table, removed from the respective case, and automatically agitated and spread with the raisin spreader 5, which automatically transfers the spread raisins into the 12' tumbler 6, which acts to declump, acidify, and clean the raisins.

About one third along the tumbler 6, a set of nozzles sprays an acid solution on the food. The acid is, for example, a citric or malic acid solution, from about 1-6% by weight. A sufficient quantity of acid solution is provided to wet the surface of the food, and form a pool toward the exit of the tumbler 6, which is then filtered and recycled. A typical ratio of acid spray to hydration water is 10:1. Near the exit of the tumbler 6, the food is submerged in an acid solution. Typical transit time through the tumbler 6 system is about 3 minutes. For example, a raisin enters the transfer conveyor with a water percentage of 10-15%, and when exiting the tumbling system has about 16-20% water. The acid spray is warm, for example about 110 F.

The partially hydrated and acidified food is then fed, from the tumbling 6 system, by a set of pins and paddles on the tumbler, to an exit conveyor, and is fed to a staging area, to form a mound. A separate conveyor transfers the food from the staging area to a tracing area as a uniform sheet, for example 1 inch thick.

From the tumbler 6, the acified raisins are transferred via an upright conveyor 7 to the staging conveyor 8, which, in turn, leads to a set of tracer-raisin spreaders 10A, 10B, which spread the acidified raisins evenly, and transfer them to an accumulator 11, allowing the acidified raisins to cure with the acidulant.

After an appropriate curing period, the raisins are dried in a drier 12 reaching a temperature of about 160-180 F, and subsequently cooled in a cooler 14, for example, to 70-80 F, with chilled air. The water percentage of the food drops about 4-7% in the dryer. For example, the water content is about the same entering the tumbler and leaving the dryer. Typically, the time between exiting the tumbling system and entering the dryer is, for example, about 30 minutes. The dryer is, for example, an 18 foot long, 3.5 foot wide conduit, held at a temperature of 160 F-180 F. A preferred dryer is gas fired, and provides a turbulent air flow of about 30 miles per hour, from the exit toward the entrance, above, below and through the conveyor belt, which is itself a metal mesh.

The hot food is then fed to a chiller, where the temperature is reduced to about 70 F by blowing cold air. According to one embodiment of the invention, the cooling of the food after the dryer is immediate, and without substantial passive cooling. This, for example, helps reduce clumping, and reduces the time for which the food is maintained in a headed condition.

The cooled raisins are then flavored in a flavoring unit 15, fed with flavorant from the flavoring dispenser 16, and transferred by an upright transfer conveyor 17 to a set of Tracer-raisin spreaders 18A, 18B. The spread raisins are then accumulated at an accumulator 19, for cooling via chilling system 43 and packaging.

The cooled food is then fed by another conveyor to an infusing tunnel, where an infusate solution is sprayed on the dried food, which contains, for example, a flavor, fortifying agent, coating, or the like. The infusate is a water spray with a solids concentration of about 1-2%. The infusing tunnel typically does not agitate the food, though in some cases, it may be desirable to tumble the dried food, for example where it is desired for the infusate to evenly coat the food.

The infused food is then fed to another staging area to a cooling tunnel, which chills the food to near freezing, e.g., 35 F, by blowing cold air. The product is then ready to be packaged.

The acidified raisins are thus dried to a suitable moisture content and then cooled to about 70-80 F. A flavoring agent, in for example an oil or glycerin based spray, is provided, which is absorbed through the skin into the raisin, but also remains on the skin. After the flavoring agent is provided, the raisins are further cooled and packaged.

The packaging section, which is separated from the initial processing stages, and especially the drier 12, by a partition 60, in order to facilitate cooling of the raisins for packaging, provides a Bucket lift 20, which feeds a staging conveyor with divider 21, from which the raisins are packaged, for example in a Stoke packaging machine 22, a Mirapack packaging machine 23, a Hanzella packaging machine 24, or a Monobag packaging machine 25. The packaged raisins from the packaging machines 22, 23, 24, 25, are transferred with a packaging take-out conveyor 29, and an upright transfer conveyor 30, past a gated inspection conveyor 31, to either a display pack-up conveyor 32 or a transfer conveyor 33 to a Langen boxing machine 35 via a Langen conveyor 34. The rolling conveyor 36A transfers the packaged goods to a padlocker 37 which groups the small "grocery store" cases into a master case. Rolling conveyor 36B transfers the master case for wrapping with a Sprialgrip wrapper 38. Alternately, an L Bar sealer 39 and Heat shrink tunnel 40 may be used to seal the packaged product.

The acidification of the food serves the purpose of "scarring" the surface to increase surface area, and making microscopic holes, which enhance permeability of water through the surface. The acidulent also acts as a preservative.

The acid forms a barrier, beneath the surface of the fruit, which limits the movement of natural sugars and the like from the core of the food toward the surface. In addition, the acid bath will remove a small portion of the natural sugar near the surface. The result is a food product which has reduced sugar near the surface, and reduced bleeding of sugars, which help prevent clumping and stickiness.

Because the infusion is done at about 70 F, and the temperatures thereafter reduced, the infusate may include heat labile components, such as vitamins and volatile components. The acid tends to neutralize the natural taste of the food product, while the infusate tends to have a high concentration at the surface. Therefore, it is feasible to alter the basic flavor characteristics of the food, for example making it taste like a different food.

For example, dried fruit products, particularly raisins, having flavors which do not correspond to the natural flavor of the dried fruits and having desirable nutritional, texture and aroma qualities may be efficiently produced. Likewise, fortified products, and coated products, are also possible.

The acidulant need not be citric or malic acid, and, for example, tartaric acid, ascorbic acid, phosphoric acid, fumaric acid, or other acceptable acid for use in foods may be used.

The infusion solution may additionally contain a humectant such as glycerol and sorbitol. Sodium citrate may also be added to provide a more tart taste, for example when preparing a lemon/lime flavored dried fruit product.

It is noted that the times and temperatures noted herein represent a preferred embodiment, and in general, such times and temperatures may be modified with the expected results, and are not deemed limiting on the scope of the invention. However, to achieve a particular desired result, the process described above is satisfactory.

The present process produces a product which has a uniform infusion, lower density than typical processes (see U.S. Pat. No. 5,188,861), and an attractive texture.

EXAMPLE 1

112 kg of Australia sultana raisins were fed through the declumping rotating drum. The raisins were then treated with warm (110 F) 1.25% citric acid solution. The speed of the drum was adjusted so that the raisins did not get substantially damaged. The acidic spray was continued for 30 minutes before conveying the acidified raisins to a staging area, where they were held for 20 minutes to stabilize. The raisins were then transferred to an Epson Eclipse dryer where they were dried for about 5 minutes at 180 F, adjusted according to the amount of acid solution absorbed. The redried raisins were then cooled down to about 70 F and jet sprayed with natural orange flavor (AFI #10589-12795) at 1.5% by weight. The raisins were allowed to soak for 15 minutes before transferring into a chilling tunnel where they were cooled to about 50 F before packaging.

EXAMPLE 2

112 kg of Australia sultana raisins were fed through the declumping rotating drum. The raisins were then treated with warm (110 F) 1.25% citric acid solution. The speed of the drum was adjusted so that the raisins did not get substantially damaged. The acidic spray was continued for 45 minutes before conveying the acidified raisins to a staging area, where they were held for 20 minutes to stabilize. The raisins were then transferred to an Epson Eclipse dryer where they were dried for about 7 minutes at 180 F, adjusted according to the amount of acid solution absorbed. The redried raisins were then cooled down to about 70 F and jet sprayed with natural lemon flavor (AFI #10589-12887) at 1.5% by weight. The raisins were allowed to soak for 15 minutes before transferring into a chilling tunnel where they were cooled to about 50 F before packaging.

EXAMPLE 3

112 kg of Australia sultana raisins were fed through the declumping rotating drum. The raisins were then treated with warm (110 F) 1.25% citric acid solution. The speed of the drum was adjusted so that the raisins did not get substantially damaged. The acidic spray was continued for 20 minutes before conveying the acidified raisins to a staging area, where they were held for 20 minutes to stabilize. The raisins were then transferred to an Epson Eclipse dryer where they were dried for about 7 minutes at 180 F, adjusted according to the amount of acid solution absorbed. The redried raisins were then cooled down to about 70 F and jet sprayed with natural cherry lemon flavor (AFI #81213-3243) at 1.5% by weight. The raisins were allowed to soak for 15 minutes before transferring into a chilling tunnel where they were cooled to about 50 F before packaging.

EXAMPLE 4

About 14 kilograms of boxed raisins are brought to a staging area, broken up slightly, and fed to the entrance of a caterpillar conveyor system tumbler, and fed into the rotating perforated drum. Pins and paddles on interior of the drum draw the raisins in, and assist in the agitation, which declump the raisins.

The raisins are initially hydrated in a wash with sprayed water, which removes any stems, captems, and debris from the raw raisins, which fall through perforated holes around the rotating drum. A catch basin is provided below, which filters the stems, capstems and debris. The raisins are then subjected to an acidification spray and then bath, which is a citric acid solution or a malic acid solution. This acid solution is heat jacketed at approximately 170°-180° Fahrenheit, which allows the acid solution to permeate the outer surface of the raisin.

The raisins are then fed through a drying tunnel system, where glycerin is optionally added. It is then cooled down to a temperature of approximately 70° Fahrenheit, where it is then spray flavored, and then goes to a staging area where it is cooled again to a temperature of approximately 50° Fahrenheit, then to another staging area where it is frozen with a nitrogen flash freeze bath. The produce is then packaged.

While certain representative embodiments of the invention have been described herein for the purpose of illustration, it will be apparent to those skilled in the art that modifications therein may be made without departing from the spirit and scope of the invention.

I claim:

1. A process for preparing a dried food product said process comprising:
    (a) treating a dried food with an aqueous acidulant, in an amount and for a period of time which is sufficient to modify a surface of the food to increase water permeability and rehydrate the dried food;
    (b) dehydrating the treated dried food at a temperature above about 150 F, until a desired moisture content is achieved;
    (c) cooling the dehydrated treated food to a temperature below about 150 F;
    (d) infusing the cooled dehydrated treated food with a heat labile infusate; and
    (e) cooling the infused cooled dehydrated treated food to a temperature of between about 50 F to 35 F for packaging.

2. The process according to claim 1, wherein the dried food comprises a fruit.

3. The process according to claim 1, wherein the heated dehydrated treated food is cooled to a temperature of between about 70 F to 100 F for the infusion.

4. The process according to claim 1, wherein said cooling step cools the dehydrated treated food to a temperature below about 100 F from a temperature above about 150 F.

5. The process according to claim 1, wherein said cooling step cools the dehydrated treated food to a temperature below about 80 F from a temperature above about 160 F.

6. The process according to claim 1, wherein said cooling step cools the dehydrated treated food to a temperature of about 70 F from a temperature between about 160 F-180 F.

7. The method according to claim 1, wherein the acidulent comprises a citric acid solution or a malic acid solution.

8. The method according to claim 1, wherein the infusate comprises a flavoring.

9. The method according to claim 1, wherein the infusate comprises a nutritional fortification.

10. The method according to claim 1, wherein said treating step is performed at least in part in a tumbler, continuously receiving the dried food, submersing the received dried food in an aqueous acidulent solution during tumbling; and continuously removing the submersed dried food from the aqueous acidulent, and wherein said infusing step is performed with a spray infuser configured to coat the cooled dehydrated treated food.

11. The method according to claim 1, wherein the infusate comprises an alcohol.

12. A continuous process for preparing a dried food product said process comprising:
    (a) treating a dried food received on a first conveyor system by submersing the dried food in a aqueous acidulant in a continuous feed tumbler system, for a period of time which is sufficient to modify a surface of the food to increase water permeability and at least partially rehydrate the dried food, while removing a portion of a water soluble component of the dried food near an outer surface which causes stickiness and clumping;
    (b) continuously removing the treated dried food from the continuous feed tumbler system and, at least partially dehydrating the treated dried food by maintaining the at least partially rehydrated dried food at a temperature above about 150 F on a second conveyor system, the at least partially dehydrated treated food having reduced clumping and stickiness with respect to the untreated dried food;
    (c) cooling the dehydrated treated food to a temperature below about 150 F by at least flowing cold air over the at least partially dehydrated dried food on a third conveyor system;
    (d) spray infusing the cooled dehydrated treated food with an infusate to evenly coat the cooled dehydrated treated food without substantially rehydrating the cooled dehydrated treated food; and
    (e) packaging the infused cooled dehydrated treated food in a series of vapor barrier packages at a temperature of between a temperature above a freezing point and 50 F.

13. The continuous process according to claim 12, wherein the dried food comprises a fruit, and the water soluble component of the dried food near an outer surface which causes stickiness and clumping comprises a natural sugar.

14. The continuous process according to claim 12, wherein the heated dehydrated treated food is cooled to a temperature of between about 70 F to 100 F for the spray infusion.

15. The continuous method according to claim 12, wherein the continuous tumbler has an inclined rotational axis to provide a gravity feed of the dried food therethrough, the aqueous acidulent comprises a citric acid solution or a malic acid solution which flows down an inclined portion of the continuous tumbler in a same direction as the gravity feed of the dried food.

16. A continuous process for preparing a dried food product said process comprising:
   (a) treating dried food continuously received as pieces by submersing the dried food in a aqueous acidulant in a continuous tumbler system having an inclined tumbling axis, for a period of time which is sufficient to modify a surface of the food to increase water permeability and at least partially rehydrate the dried food, while removing a portion of a water soluble component of the dried food near an outer surface which causes stickiness and clumping, and continuously removing that at least partially rehydrated dried food pieces from the aqueous acidulent, wherein the aqueous acidulent flows down an inclined portion of the continuous tumbler in a same flow direction as a transport direction of the dried food, and at least a portion of the aqueous acidulent which has already been used to treat the dried food is captured from a bottom portion of the continuous tumbler, filtered and recycled at a top portion of the continuous tumbler;
   (b) at least partially dehydrating the treated dried food by maintaining the at least partially rehydrated dried food at a temperature above about 150 F on a second conveyor system, the at least partially dehydrated treated food having reduced clumping and stickiness with respect to the untreated dried food;
   (c) cooling the dehydrated treated food to a temperature below about 150 F by at least flowing cold air over the at least partially dehydrated dried food on a third conveyor system;
   (d) spray infusing the cooled dehydrated treated food with a heat labile infusate to evenly coat the cooled dehydrated treated food without substantially rehydrating the cooled dehydrated treated food; and
   (e) packaging portions of the infused cooled dehydrated treated food in vapor barrier packages, substantially without clumping at a temperature of between a temperature above a freezing point and 50 F.

17. The continuous method according to claim 12, wherein the heat labile infusate comprises at least one of a flavoring and a nutritional fortification.

* * * * *